US009656533B2

(12) United States Patent
Cho et al.

(10) Patent No.: US 9,656,533 B2
(45) Date of Patent: May 23, 2017

(54) STACKED PLATE HEAT EXCHANGER FOR AN LPG-FUELED VEHICLE

(71) Applicant: Hyundai Motor Company, Seoul (KR)

(72) Inventors: Wan Je Cho, Whasung-Si (KR); Jae Yeon Kim, Whasung-Si (KR); Soo Yong Park, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 594 days.

(21) Appl. No.: 13/722,021

(22) Filed: Dec. 20, 2012

(65) Prior Publication Data
US 2014/0116649 A1  May 1, 2014

(30) Foreign Application Priority Data

Oct. 26, 2012 (KR) .......................... 10-2012-0119953

(51) Int. Cl.
| | |
|---|---|
| B60H 1/00 | (2006.01) |
| F02M 31/20 | (2006.01) |
| F28D 9/00 | (2006.01) |
| F02M 21/02 | (2006.01) |

(Continued)

(52) U.S. Cl.
CPC ..... *B60H 1/00342* (2013.01); *B60H 1/00271* (2013.01); *F02D 19/022* (2013.01); *F02M 21/0212* (2013.01); *F02M 21/0287* (2013.01); *F02M 31/20* (2013.01); *F28D 9/005* (2013.01); *F28D 9/0093* (2013.01); *F28D 2021/0087* (2013.01); *F28F 2280/04* (2013.01);

(Continued)

(58) Field of Classification Search
CPC ........... F02M 21/0287; F02M 21/0212; F02M 31/20; F02D 19/022; F28F 2280/06; F28F 2280/04; F28D 2012/0087; F28D 9/005; F28D 9/0093; B60H 1/00342
USPC ................................. 62/48.4, 50.3, 53.2, 481
See application file for complete search history.

(56) References Cited

U.S. PATENT DOCUMENTS 3,565,201 A *  2/1971  Petsinger ............. B60K 15/013
                                                    62/50.2
4,335,697 A *  6/1982  McLean ................. F02M 13/08
                                                    123/525

(Continued)

FOREIGN PATENT DOCUMENTS

| CN | 1151207 A | 6/1997 |
|---|---|---|
| CN | 101107491 A | 1/2008 |

(Continued)

*Primary Examiner* — Ljiljana Ciric
(74) *Attorney, Agent, or Firm* — Morgan Lewis & Bockius LLP

(57) ABSTRACT

A heat exchanger apparatus for a vehicle includes a heat exchanging unit including one or more plate units in which two or more plates are stacked to form different connection channels and exchanging heat with each other while different operating fluids pass through the respective connection channels in the heat exchanging unit, an upper cover mounted on one side of the heat exchanging unit, and including a plurality of inlets that introduce each operating fluid into the heat exchanging unit and are interconnected with the respective connection channels, and a lower cover mounted on the other side of the heat exchanging unit, and including a plurality of outlets that are interconnected with the respective connection channels so as to discharge the each operating fluid passing through the heat exchanging unit.

11 Claims, 13 Drawing Sheets

(51) Int. Cl.
*F02D 19/02* (2006.01)
*F28D 21/00* (2006.01)

(52) U.S. Cl.
CPC ......... *F28F 2280/06* (2013.01); *Y02T 10/126* (2013.01); *Y02T 10/32* (2013.01)

(56) References Cited

U.S. PATENT DOCUMENTS

| | | | | |
|---|---|---|---|---|
| 4,480,439 A * | 11/1984 | Yamane | ............ | F02B 29/0443 62/524 |
| 4,774,909 A * | 10/1988 | Dolderer | ............ | F02B 43/10 123/1 A |
| 4,790,145 A * | 12/1988 | Thompson | ............ | F02M 31/20 123/41.31 |
| 5,033,444 A * | 7/1991 | Kaufman | ............ | F02B 43/00 123/1 A |
| 5,375,580 A * | 12/1994 | Stolz | ............ | F02B 29/0443 123/527 |
| 5,462,113 A | 10/1995 | Wand | | |
| 5,540,208 A * | 7/1996 | Kikutani | ............ | F02B 43/00 62/48.2 |
| 5,950,715 A | 9/1999 | Jonsson et al. | | |
| 5,964,280 A | 10/1999 | Wehrmann et al. | | |
| 6,142,221 A | 11/2000 | Johansson | | |
| 6,216,675 B1 * | 4/2001 | Bennett | ............ | B60K 15/03006 123/514 |
| 6,250,290 B1 * | 6/2001 | Mullen | ............ | F02M 53/00 123/541 |
| 6,948,559 B2 * | 9/2005 | Reinke | ............ | F28D 9/005 165/140 |
| 6,953,029 B2 * | 10/2005 | Uitenbroek | ............ | F02B 43/12 123/527 |
| 7,373,932 B2 * | 5/2008 | Hayashi | ............ | F02M 21/06 123/527 |
| 7,380,544 B2 * | 6/2008 | Raduenz | ............ | F28D 9/0056 123/568.12 |
| 7,946,339 B2 * | 5/2011 | So | ............ | F28D 1/0246 165/140 |
| 8,448,460 B2 * | 5/2013 | Dogariu | ............ | B60H 1/00278 62/178 |
| 8,869,398 B2 * | 10/2014 | Kent | ............ | B21D 53/04 29/890.03 |
| 8,905,122 B2 * | 12/2014 | Kim | ............ | F28F 1/424 165/141 |
| 9,140,473 B2 * | 9/2015 | Kim | ............ | F25B 39/04 |
| 9,151,542 B2 * | 10/2015 | Otahal | ............ | F28D 9/005 |
| 9,163,882 B2 * | 10/2015 | Crawford | ............ | F28D 9/005 |
| 9,228,784 B2 * | 1/2016 | Reif | ............ | F28D 9/005 |
| 9,233,197 B2 * | 1/2016 | Jonsson | ............ | A61M 1/3621 |
| 9,234,604 B2 * | 1/2016 | Kim | ............ | F28F 27/02 |
| 9,239,195 B2 * | 1/2016 | Kim | ............ | F28D 9/005 |
| 9,243,849 B2 * | 1/2016 | Saumweber | ............ | F28D 9/005 |
| 9,255,748 B2 * | 2/2016 | Cho | ............ | F28F 27/02 |
| 9,310,136 B2 * | 4/2016 | Andersson | ............ | F28D 9/005 |
| 9,316,448 B2 * | 4/2016 | Kanzaka | ............ | F28F 3/025 |
| 9,322,319 B2 * | 4/2016 | Kim | ............ | F01P 3/18 |
| 2006/0218939 A1 * | 10/2006 | Turner | ............ | F25J 1/0022 62/4 |
| 2007/0017250 A1 * | 1/2007 | Turner | ............ | F25J 1/0204 62/613 |
| 2007/0107465 A1 * | 5/2007 | Turner | ............ | F25J 1/0022 62/613 |
| 2007/0267169 A1 * | 11/2007 | Acre | ............ | B60H 1/3227 165/42 |
| 2008/0016883 A1 * | 1/2008 | Roth | ............ | F04B 15/08 62/7 |
| 2008/0271707 A1 * | 11/2008 | Nozaki | ............ | F02D 33/006 123/446 |
| 2009/0126691 A1 * | 5/2009 | Bach | ............ | F02B 29/0418 123/480 |
| 2009/0241573 A1 * | 10/2009 | Ikegami | ............ | B60H 1/00335 62/498 |
| 2011/0024095 A1 * | 2/2011 | Kozdras | ............ | F28D 9/005 165/167 |
| 2011/0094262 A1 * | 4/2011 | Turner | ............ | F25J 1/0022 62/613 |
| 2011/0094263 A1 * | 4/2011 | Wilding | ............ | F25J 1/0022 62/613 |
| 2011/0290203 A1 * | 12/2011 | Pursifull | ............ | F02D 19/0605 123/41.08 |
| 2011/0303166 A1 * | 12/2011 | Hopkins | ............ | C01B 3/0005 123/3 |
| 2012/0036888 A1 * | 2/2012 | Vandor | ............ | F25J 1/0022 62/613 |
| 2012/0137725 A1 * | 6/2012 | Kim | ............ | B60H 1/00342 62/509 |
| 2012/0291478 A1 * | 11/2012 | Kim | ............ | F25B 39/04 62/507 |
| 2012/0325181 A1 * | 12/2012 | Burke | ............ | F02B 29/0443 123/540 |
| 2013/0133855 A1 * | 5/2013 | Kim | ............ | F28F 1/424 165/41 |
| 2013/0145789 A1 * | 6/2013 | Kim | ............ | F25B 39/04 62/506 |
| 2013/0146246 A1 * | 6/2013 | Kim | ............ | F02M 31/20 165/41 |
| 2013/0146265 A1 * | 6/2013 | Kim | ............ | F25B 39/04 165/166 |
| 2013/0228151 A1 * | 9/2013 | Dunn | ............ | F02M 21/0209 123/294 |
| 2013/0263829 A1 * | 10/2013 | Demots | ............ | F02M 31/20 123/563 |
| 2014/0109971 A1 * | 4/2014 | Kim | ............ | F16L 53/00 137/1 |
| 2014/0260403 A1 * | 9/2014 | Connell | ............ | B60H 1/3202 62/323.1 |
| 2015/0292803 A1 * | 10/2015 | Nyander | ............ | F28F 3/10 165/166 |
| 2015/0354899 A1 * | 12/2015 | Denoual | ............ | F28D 7/0025 165/166 |

FOREIGN PATENT DOCUMENTS

| | | |
|---|---|---|
| JP | 63-90765 U | 6/1988 |
| JP | 1-173569 U | 12/1989 |
| JP | 6-265284 A | 9/1994 |
| JP | 2000-171177 A | 6/2000 |
| JP | 2000-337784 A | 12/2000 |
| JP | 2002-506196 A | 2/2002 |
| JP | 2006-71685 A | 3/2006 |
| JP | 2007-247639 A | 9/2007 |
| JP | 2008-267190 A | 11/2008 |
| JP | 2009-539022 A | 11/2009 |
| JP | 2012-67643 A | 4/2012 |
| KR | 1020010061736 A | 7/2001 |

* cited by examiner

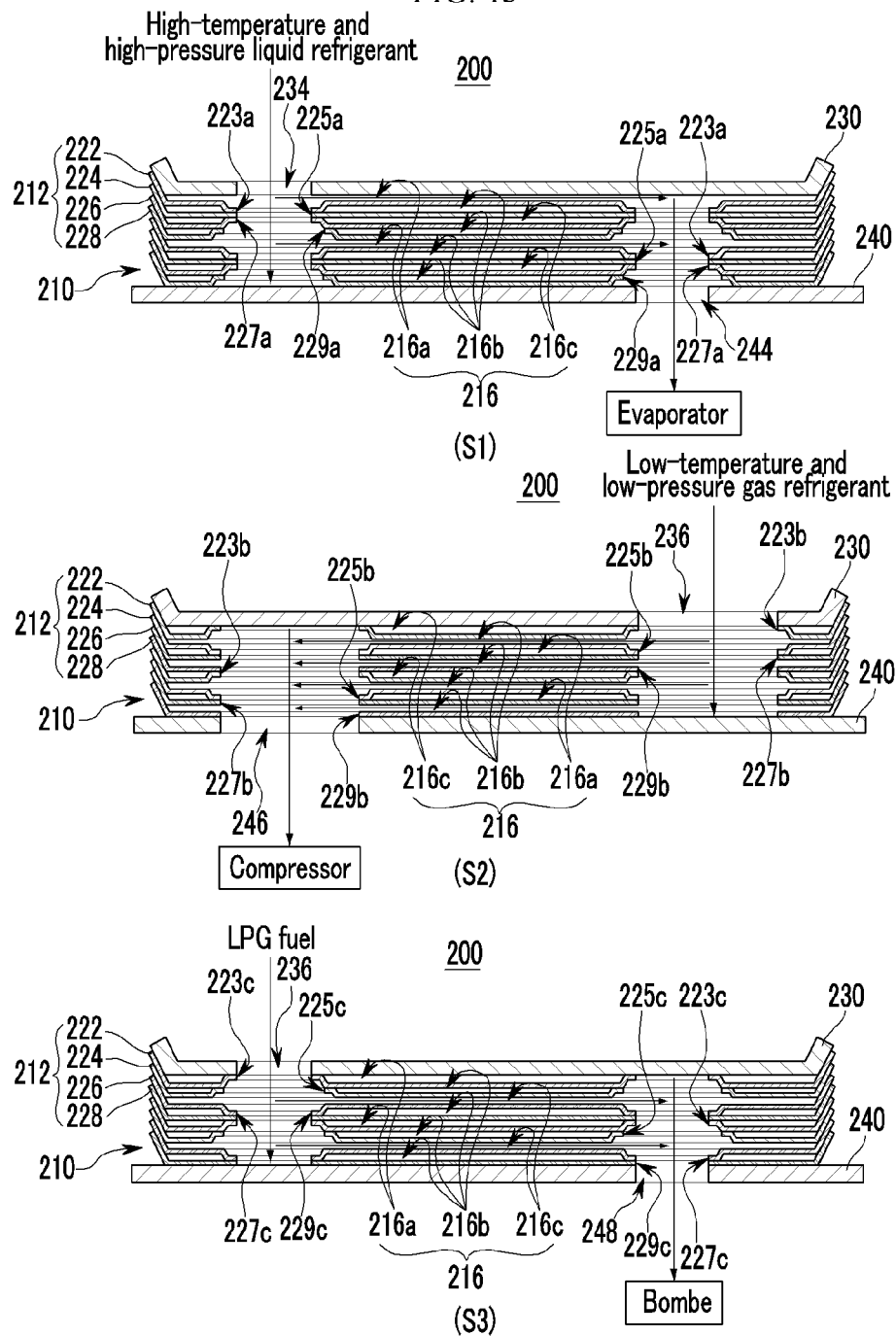

STACKED PLATE HEAT EXCHANGER FOR AN LPG-FUELED VEHICLE

CROSS-REFERENCE TO RELATED APPLICATION

The present application claims priority to Korean Patent Application No. 10-2012-0119953 filed on Oct. 26, 2012, the entire contents of which is incorporated herein for all purposes by this reference.

BACKGROUND OF THE INVENTION

1. Field of the Invention

The present invention relates to a heat exchange for a vehicle. More particularly, the present invention relates to a heat exchanger for a vehicle that efficiently cools LPG fuel by exchanging heat between LPG fuel returned to a bombe from an engine of an LPI vehicle and refrigerant that is circulated in an air-conditioning system.

2. Description of Related Art

In general, a liquefied petroleum injection (LPI, an LPG liquefied fuel injection device) engine is an engine (Mono-fuel mode) having a fuel pump installed in a bombe and injects liquefied fuel for each cylinder by using an injector by liquefying LPG fuel at high pressure (5 to 15 bar) by the fuel pump, unlike a mechanical LPG fuel mode that depends on the pressure of a bombe.

Since the LPI engine injects liquefied fuel, components such as a vaporizer, a mixer, and the like which are constituent members of a mixer type LPG engine are not required, and the LPI engine includes a high-pressure injector, the fuel pump installed in the bombe, a fuel supply line, an electronic control unit (ECU) exclusively for LPI, and a regulator unit regulating fuel pressure.

The electronic control unit of the LPI engine determines a state of the engine by receiving input signals of various sensors and controls a fuel pump, an injector, and an ignition coil for improvement of an optimal air-fuel ratio and engine performance.

In addition, the liquefied fuel is supplied to the engine by controlling the fuel pump according to a fuel amount required in the engine, and an LPI injector sequentially injects fuel for each cylinder.

However, in a vehicle to which an LPI system in the related art is applied, as high-temperature return fuel is returned to the bombe from the engine, a phenomenon occurs, in which internal pressure of the bombe rises due to an increase in temperature of the LPG fuel. In particular, when the internal pressure of the bombe is higher than charge pressure of a gas station, the LPG fuel cannot be charged in the bombe.

As a result, since an additional fuel cooling device needs to be installed in order to decrease the temperature of the fuel returned from the engine, manufacturing and installation costs increase and there is a limit in securing installation space in a narrow engine room.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heat exchanger for a vehicle that prevents internal pressure of a bombe from increasing by introducing LPG fuel into the bombe while decreasing the temperature of the LPG fuel by exchanging heat between refrigerant that is circulated in an air-conditioning system and LPG fuel returned to a bombe from an engine.

In an aspect of the present invention, a heat exchanger apparatus for a vehicle, may include a heat exchanging unit including one or more plate units in which two or more plates are stacked to form different connection channels and exchanging heat with each other while different operating fluids pass through the respective connection channels in the heat exchanging unit, an upper cover mounted on one side of the heat exchanging unit, and including a plurality of inlets that introduce each operating fluid into the heat exchanging unit and are interconnected with the respective connection channels, and a lower cover mounted on the other side of the heat exchanging unit, and including a plurality of outlets that are interconnected with the respective connection channels so as to discharge the each operating fluid passing through the heat exchanging unit.

The plate unit may include a first plate coupled with being stacked on the upper cover below the upper cover, and including a first connection channel formed between the first plate and the upper cover and a plurality of connection holes formed to correspond to the respective inlets and the respective outlets, a second plate coupled with being stacked on the first plate below the first plate, and including a second connection channel formed between the second plate and the first plate and a plurality of connection holes formed to correspond to the respective inlets and the respective outlets, and a third plate coupled with being stacked on the second plate below the second plate, and including a third connection channel formed between the third plate and the second plate and a plurality of connection holes formed to correspond to the respective inlets and the respective outlets.

The plurality of inlets may include first, second, and third inlets respectively spaced from each other in a length direction of the upper cover and connected with the first, second, and third connection channels through the respective connection holes, wherein the plurality of outlets may include first, second, and third outlets respectively spaced from each other on the lower cover to correspond to the first, second, and third inlets, and connected with the first, second, and third inlets through the first, second, and third connection channels and the respective connection holes.

In the first plate, first, second, and third connection holes are formed to correspond to the first, second, and third inlets, and the first, second, and third outlets, respectively, wherein in the second plate, first, second, and third connection holes are formed to correspond to the first, second, and third inlets, and the first, second, and third outlets, respectively, and wherein in the third plate, first, second, and third connection holes are formed to correspond to the first, second, and third inlets, and the first, second, and third outlets, respectively, wherein inner peripheries of the second and third connection holes of the first plate protrude upward and an inner periphery of the first connection hole thereof protrudes downward, wherein an inner periphery of the third connection hole of the second plate protrudes upward and an inner periphery of the second connection hole thereof protrudes downward, wherein an inner periphery of the first connection hole of the third plate protrudes upward, and wherein airtightness of inner peripheries of the respective connection holes is maintained so as to prevent the each operating fluid that flows in the respective connection channels from being mixed.

The first inlet is formed at one side in a width direction at the center of the upper cover, and the first outlet is formed at a diagonal corresponding position from the first inlet of the lower cover.

The second inlet is formed at one side of the upper cover, and the second outlet is formed at a diagonal corresponding position of the lower cover.

The third inlet is formed at one side of the upper cover, and the third outlet is formed at a diagonal corresponding position from the third inlet of the lower cover.

The each operating fluid may include medium-temperature and high-pressure liquid refrigerant supplied from a condenser of an air-conditioning system, introduced through the first inlet to pass through the first connection holes and the first connection channels of the respective plates and thereafter, discharged through the first outlets, low-temperature and low-pressure gas refrigerant supplied from an evaporator, introduced through the second inlet to pass through the second connection holes and the second connection channels of the respective plates and thereafter, discharged through the second outlets, and LPG fuel returned to a bombe from an engine of an LPI vehicle, introduced through the third inlet to pass through the third connection holes and the third connection channels of the respective plates and thereafter, discharged through the third outlet.

The medium-temperature and high-pressure liquid refrigerant and the LPG fuel flow in the same direction on the first connection channels and the third connection channels, respectively, and the low-temperature and low-pressure gas refrigerant flows in a direction different from the liquid refrigerant and the LPG fuel in the second connection channels.

The first outlet is connected with an expansion valve, the second outlet is connected with a compressor, and the third outlet is connected with the bombe in which the LPG fuel is returned and stored.

In the first, second, and third plates, first, second, and third verification grooves are formed at sides of the respective plates to verify that the respective plates are sequentially assembled when the respective plates are stacked and coupled with each other.

The respective verification grooves may have different numbers.

The heat exchanging unit is formed by a plate type in which a plurality of plate units is stacked.

The plate unit may include a first plate coupled with being stacked on the upper cover below the upper cover, and including a first connection channel formed between the first plate and the upper cover and a plurality of connection holes formed to correspond to the respective inlets and the respective outlets, respectively, a second plate coupled with being stacked on the first plate below the first plate, and including a second connection channel formed between the second plate and the first plate and a plurality of connection holes formed to correspond to the respective inlets and the respective outlets, respectively, and a third plate coupled with being stacked on the second plate below the second plate, and including a third connection channel formed between the third plate and the second plate, and a plurality of connection holes formed to correspond to the respective inlets and the respective outlets, respectively, and a fourth plate coupled with being stacked on the third plate below the third plate, and including the second connection channel between the fourth plate and the third plate and a plurality of connection holes formed on the fourth plate to correspond to the respective inlets and the respective outlets, respectively.

The plurality of inlets may include first, second, and third inlets respectively spaced from each other in a length direction of the upper cover and connected with the first, second, and third connection channels through the respective connection holes, wherein the plurality of outlets may include first, second, and third outlets respectively spaced from each other on the lower cover to correspond to the first, second, and third inlets, and including first, second, and third outlets connected with the first, second, and third inlets through the first, second, and third connection channels and the respective connection holes.

In the first plate, first, second, and third connection holes are formed to correspond to the first, second, and third inlets and the first, second, and third outlets, respectively, wherein in the second plate, first, second, and third connection holes are formed to correspond to the first, second, and third inlets and the first, second, and third outlets, respectively, wherein in the third plate, first, second, and third connection holes are formed to correspond to the first, second, and third inlets and the first, second, and third outlets, respectively, wherein in the fourth plate, first, second, and third connection holes are formed to correspond to the first, second, and third inlets and the first, second, and third outlets, respectively, wherein inner peripheries of the second and third connection holes of the first plate protrude upward and an inner periphery of the first connection hole thereof protrudes downward, wherein an inner periphery of the third connection hole of the second plate protrudes upward and an inner periphery of the second connection hole thereof protrudes downward, wherein an inner periphery of the first connection hole of the third plate protrudes upward and an inner periphery of the third connection hole thereof protrudes downward, wherein an inner periphery of the first connection hole of the fourth plate protrudes upward, and wherein airtightness of inner peripheries of the respective connection holes is maintained so as to prevent each operating fluid that flows in the respective connection channels from being mixed.

In the first, second, third, and fourth plates, first, second, third, and fourth verification grooves are formed at sides of the respective plates to verify that the respective plates are sequentially assembled when the respective plates are stacked and coupled with each other.

The respective verification grooves may have different numbers.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 13 is an operational state diagram of the heat exchanger for a vehicle according to another exemplary embodiment of the present invention.

Figure 1:
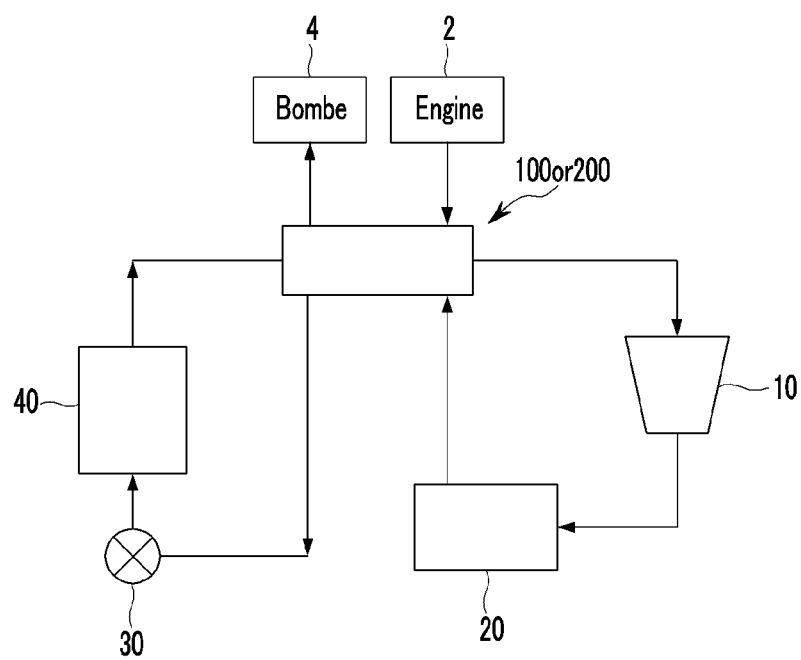
FIG. 1 is a configuration diagram of an air-conditioning system to which a heat exchanger for a vehicle is applied according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

As those skilled in the art would realize, the described embodiments may be modified in various different ways, all without departing from the spirit or scope of the present invention Throughout the specification, like/similar reference numerals refer to like/similar constituent elements.

Throughout the specification, unless explicitly described to the contrary, the word "include" and variation such as "includes" or "including", will be understood to imply the inclusion of stated elements but not the exclusion of any other elements.

Figure 2:
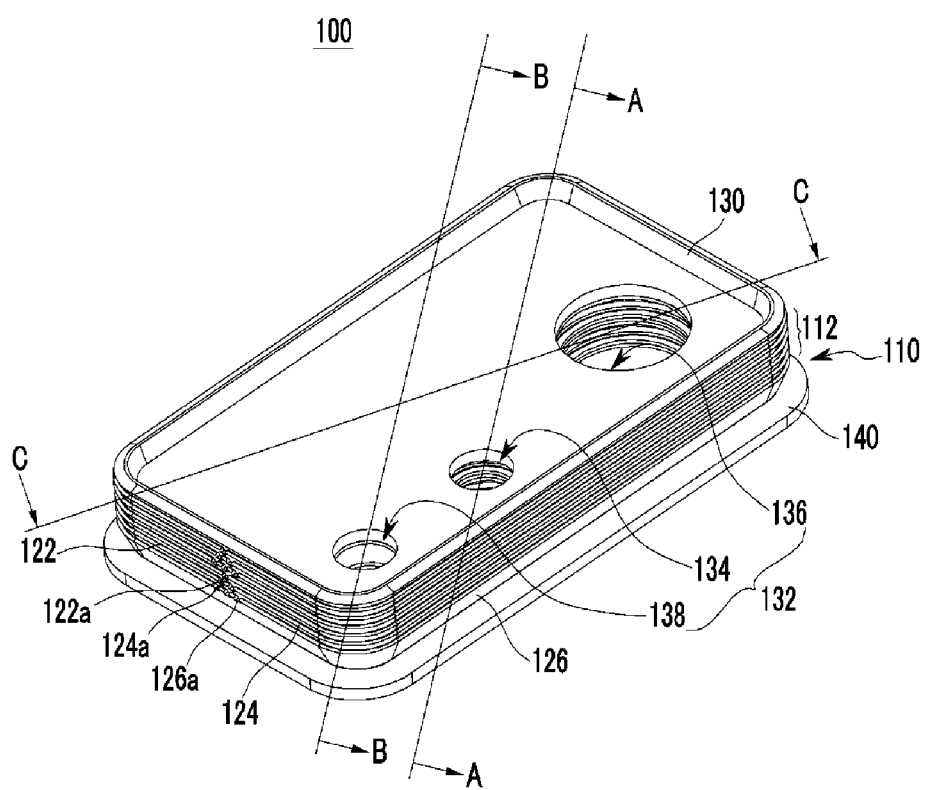
FIG. 2 is a perspective view of the heat exchanger for a vehicle according to the exemplary embodiment of the present invention.
Figure 3:
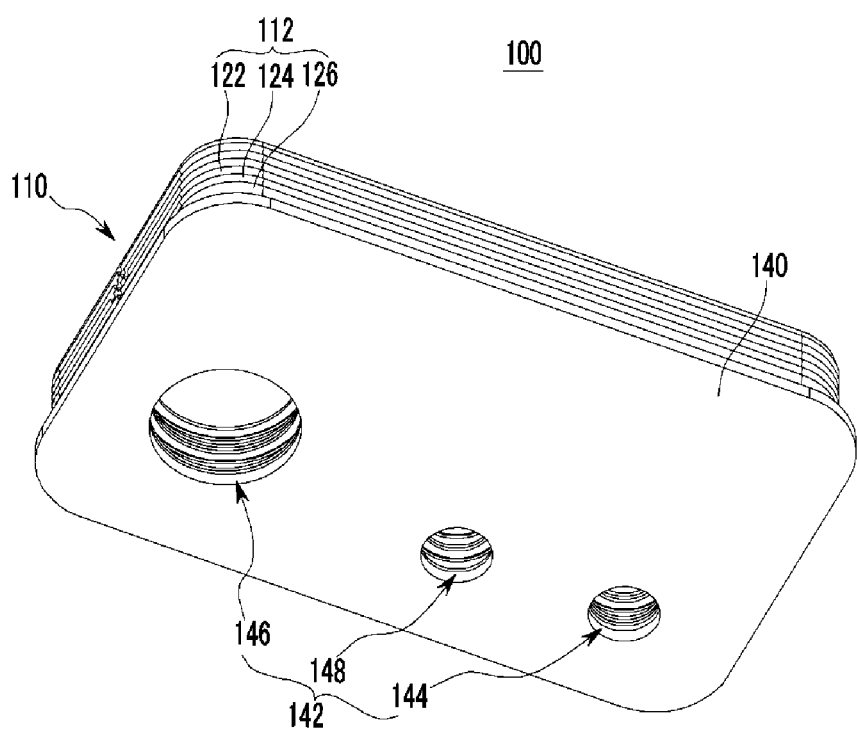
FIG. 3 is a back perspective view of the heat exchanger for a vehicle according to the exemplary embodiment of the present invention.
Figure 4:
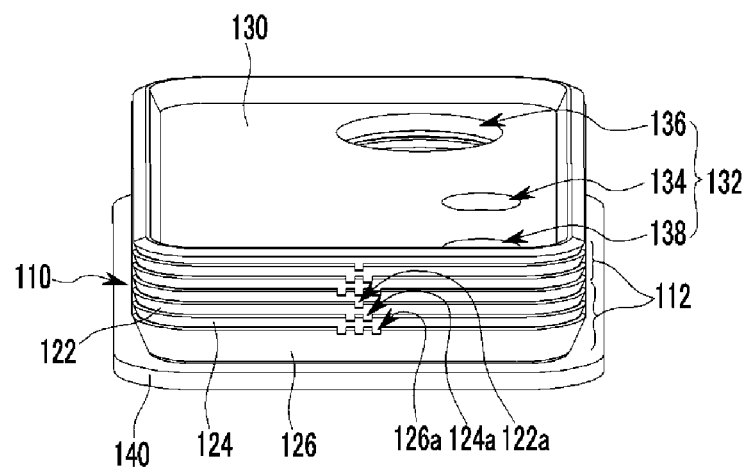
FIG. 4 is an exploded perspective view of a plate unit applied to the heat exchanger for a vehicle according to the exemplary embodiment of the present invention.
Figure 5:
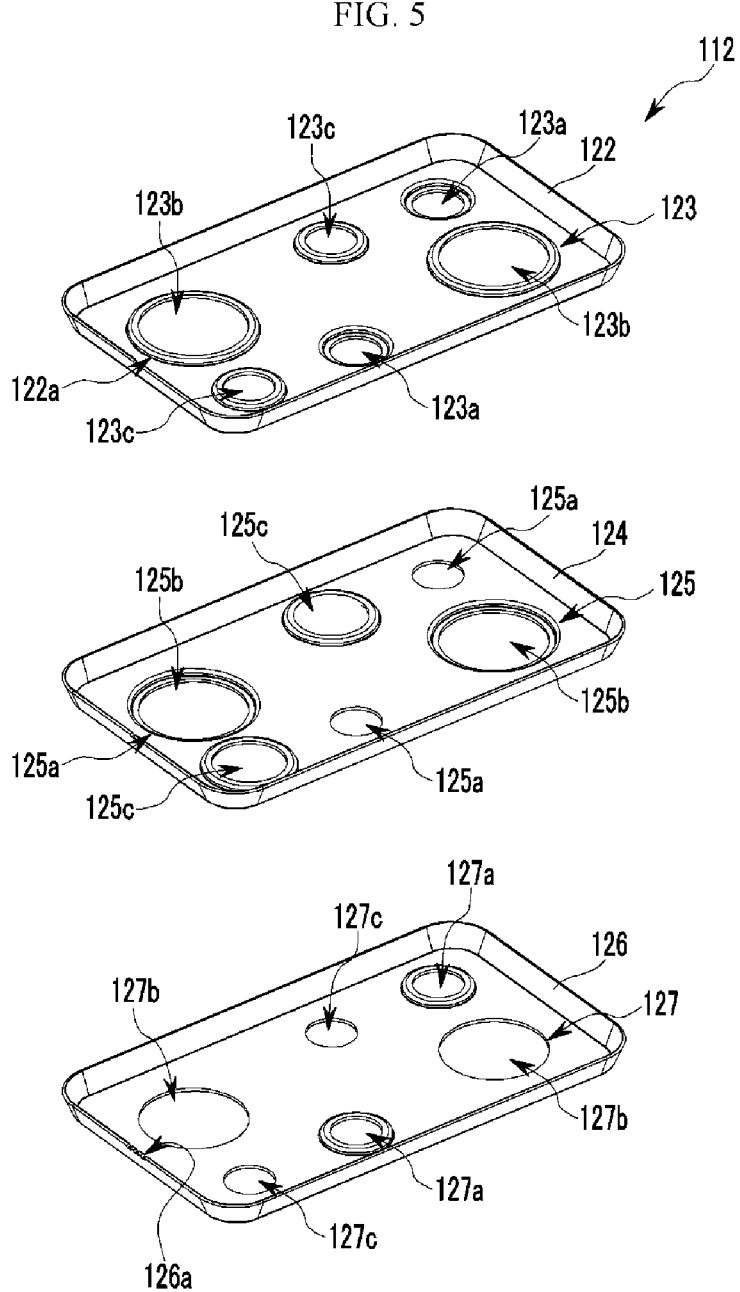
FIG. 5 is a side view of the heat exchanger for a vehicle according to the exemplary embodiment of the present invention.
Figure 6:
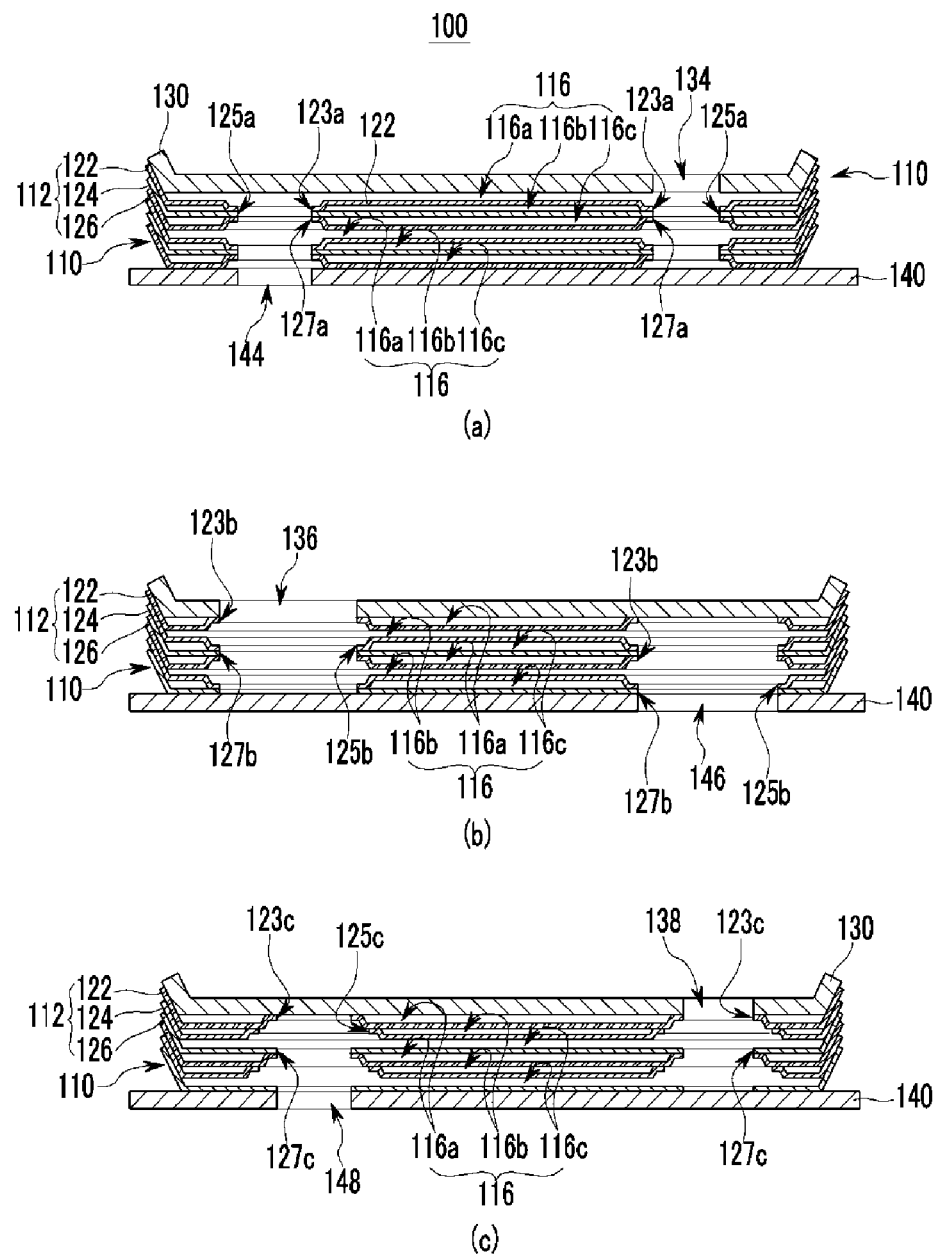
FIG. 6 is a cross-sectional view taken along lines A-A, B-B, and C-C of FIG. 2.

FIG. 1 is a configuration diagram of an air-conditioning system to which a heat exchanger for a vehicle is applied according to an exemplary embodiment of the present invention, FIGS. 2 and 3 are a perspective view and a back perspective view of the heat exchanger for a vehicle according to the exemplary embodiment of the present invention, FIG. 4 is an exploded perspective view of a plate unit applied to the heat exchanger for a vehicle according to the exemplary embodiment of the present invention, FIG. 5 is a side view of the heat exchanger for a vehicle according to the exemplary embodiment of the present invention, and FIG. 6 is a cross-sectional view taken along lines A-A, B-B, and C-C of FIG. 2.

Referring to the drawings, a heat exchanger 100 for a vehicle according to the exemplary embodiment of the present invention is applied to an air-conditioning system including a compressor 10 compressing refrigerant, a condenser 20 condensing the compressed refrigerant by receiving the compressed refrigerant from the compressor 10, an expansion valve 30 expanding liquefied refrigerant condensed through the condenser 20, and an evaporator 40 evaporating the refrigerant expanded through the expansion valve 30 through heat-exchange with air.

The heat exchanger 100 cools high-temperature LPG fuel returned from an engine 2 in an LPI vehicle using LPG fuel through heat-exchange with refrigerant.

To this end, the heat exchanger 100 for a vehicle according to the exemplary embodiment of the present invention includes a heat exchanging unit 110, an upper cover 130, and a lower cover 140, and will be described below in more detail for each component, as illustrated in FIGS. 2 and 3.

First, the heat exchanging unit 110 includes a plate unit 112 in which two or more plates are stacked to form different connection channels 116 (see FIG. 6), and different operating fluids exchange heat with each other while passing through the respective connection channels 116 in the heat exchanging unit 110.

The heat exchanging unit 110 configured as above may be formed by a plate type (alternatively, also referred to as a 'plate type') in which a pair of plate units 112 are laminated and coupled with each other or configured by coupling a plurality of plate units, as illustrated in the drawings. A detailed configuration of the plate unit 112 will be described below in more detail.

In the exemplary embodiment, the upper cover 130 is mounted on the top of the heat exchanging unit 110, and a plurality of inlets 132 that introduce each operating fluid into the heat exchanging unit 110 and are interconnected with the respective connection channels 116 are formed on the upper cover 130.

The lower cover 140 is mounted on the bottom of the heat exchanging unit 110, and a plurality of outlets 142 that are interconnected with the respective connection channels 116 is formed in the lower cover 140 so as to discharge the operating fluids passing through the heat exchanging unit 110 outside.

Herein, the plate unit 112 may include a first plate 122, a second plate 124, and a third plate 126, as illustrated in FIGS. 4 and 5, and (a), (b) and (c) of FIG. 6.

The first plate 122 is coupled with being stacked on the upper cover 130 below the upper cover 130.

A first connection channel 116a is formed between the first plate 122 and the upper cover 130, and a plurality of connection holes 123 is formed in the first plate 122 to correspond to the respective inlets 132 and the respective outlets 142.

In the exemplary embodiment, the second plate 124 is coupled with being stacked on the first plate 122 below the first plate 122.

A second connection channel 116b is formed between the second plate 124 and the first plate 122, and a plurality of connection holes 125 is formed in the second plate 124 to correspond to the respective inlets 132 and the respective outlets 142.

The third plate 126 is coupled with being stacked on the second plate 124 below the second plate 124.

A third connection channel 116c is formed between the third plate 126 and the second plate 124, and a plurality of connection holes 127 is formed in the third plate 126 to correspond to the respective inlets 132 and the respective outlets 142.

When the first, second, and third plates 122, 124, and 126 configured as above are stacked and coupled with each other, the first, second, and third plates 122, 124, and 126 are sequentially assembled with each other, and for this, first, second, and third verification grooves 122a, 124a, and 126a are formed on the first, second, and third plates 122, 124, and 126, respectively so as to prevent the respective operating fluids introduced into the respective connection channels 116a, 116, and 116c from being mixed with each other.

The respective verification grooves 122a, 124a, and 126a may be formed in order to verify whether the respective plates 122, 124, and 126 are misassembled when the respective plates 122, 124, and 126 are assembled with each other. For example, the first verification groove 122a may be formed in one, the second verification groove 124a may be formed in two, and the third verification groove 126a may be formed in three.

As a result, a worker may assemble the plate unit 112 by sequentially stacking the first, second, and third plates 122, 124, and 126 through the respective verification grooves 122a, 124a, and 126a at the time of assembling the first, second, and third plates 122, 124, and 126.

Since the worker may easily determine whether the plate unit 112 is misassembled by verifying arrangement of the respective verification grooves 122a, 124a, and 126a at the time of inspection for the misassembly verification of the assembled plate unit 112, the misassembly of the plate unit 112 may be easily verified and a time required for inspection may be shortened.

Meanwhile, in the exemplary embodiment, the respective inlets 132 are formed apart from the upper cover 130 and include first, second, and third inlets 134, 136, and 138 connected with the first, second, and third connection channels 116a, 116b, and 116c through the respective connection holes 123, 125, and 127.

The respective outlets 142 are formed apart from the lower cover 140 to correspond to the first, second, and third inlets 134, 136, and 138, respectively, and include first, second, and third outlets 144, 146, and 148 connected with the first, second, and third inlets 134, 136, and 138 through the first, second, and third connection channels 116a, 116b, and 116c and the respective connection holes 123, 125, and 127.

In the exemplary embodiment, the first inlet 134 may be formed at one side in a width direction at the center of the upper cover 130, and the first outlet 144 may be formed at a diagonal corresponding position from the first inlet 134 of the lower cover 140.

The second inlet 136 may be formed at one side of the upper cover 130, and the second outlet 146 may be formed at a diagonal corresponding position of the lower cover 140 from the second inlet 136.

The third inlet 138 may be formed at the other edge of the upper cover 130, and the third outlet 148 may be formed at one side in a width direction at the center of the lower cover 140 corresponding to a diagonal direction from the third inlet 138.

Meanwhile, in the exemplary embodiment, first, second and third connection holes 123a, 123b, and 123c are formed in the first plate 122 to correspond to the first, second, and third inlets 134, 136, and 138 and the first, second, and third outlets 144, 146, and 148, respectively, as illustrated in FIGS. 5 and 6.

Herein, the first, second, and third connection holes 123a, 123b, and 123c of the first plate 122 may be each formed in two to correspond to the respective inlets 134, 136, and 138 and the respective outlets 144, 146, and 148.

In the exemplary embodiment, first, second and third connection holes 125a, 125b, and 125c are formed on the second plate 124 to correspond to the first, second, and third inlets 134, 136, and 138 and the first, second, and third outlets 144, 146, and 148, respectively.

Herein, the first, second, and third connection holes 125a, 125b, and 125c of the second plate 124 may be each formed in two to correspond to the respective inlets 134, 136, and 138 and the respective outlets 144, 146, and 148.

First, second and third connection holes 127a, 127b, and 127c are formed on the third plate 126 to correspond to the first, second, and third inlets 134, 136, and 138 and the first, second, and third outlets 144, 146, and 148, respectively.

Herein, the first, second, and third connection holes 127a, 127b, and 127c of the third plate 126 may be each formed in two to correspond to the respective inlets 134, 136, and 138 and the respective outlets 144, 146, and 148.

Inner peripheries of the second connection hole 123b and the third connection hole 123c of the first plate 122 protrude upward of the first plate 122 and an inner periphery of the first connection hole 123a protrudes downward of the first plate 122.

An inner periphery of the third connection hole 125c of the second plate 124 protrudes upward of the second plate 124, and an inner periphery of the second connection hole 125b may protrude downward of the second plate 124.

An inner periphery of the first connection hole 127a of the third plate 126 may protrude upward of the third plate 126.

Herein, airtightness of the inner peripheries of the respective connection holes may be maintained so as to prevent the operating fluids that flow on the respective connection channels from being mixed.

That is, as illustrated in (a) of FIG. 6, the first connection hole 123a of the first plate 122 and the first connection hole 127a of the third plate 126 protrude upward and the bottom, respectively to closely contact the first connection hole 125a of the second plate 124, and as a result, a passage that communicates with the first connection channel 116a may be formed while airtightness of the second connection channel 116b and the third connection channel 116c is maintained. That is, a passage may be formed, through which the first inlet 134 and the first outlet 144 communicate with each other.

As illustrated in (b) of FIG. 6, the second connection hole 123b of the first plate 122 protrudes upward to closely contact the upper cover 130 or the second connection hole 127b of the third plate 126, and the second connection hole 125b of the second plate 126 protrudes downward to closely contact the lower cover 140 or the second connection hole 127b of the third plate 126. Accordingly, a passage which communicates with the second connection channel 116b may be formed while airtightness of the first connection channel 116a and the third connection channel 116c is maintained. That is, a passage may be formed, through which the second inlet 136 and the second outlet 146 communicate with each other.

As illustrated in (c) of FIG. 6, the third connection hole 123c of the first plate 122 protrudes upward to closely contact the upper cover 130 or the third connection hole 127c of the third plate 126, and the third connection hole 125c of the second plate 124 protrudes upward to closely contact the third connection hole 123c of the first plate 122. Accordingly, a passage which communicates with the third connection channel 116c may be formed while airtightness of the first connection channel 116a and the second connection channel 116b is maintained. That is, a passage may be formed, through which the third inlet 138 and the third outlet 148 communicate with each other.

That is, airtightness of the inner peripheries of the respective connection holes may be maintained so as to prevent the operating fluids that flow on the respective connection channels from being mixed.

As a result, when the assembly of the first plate unit 112 is completed with the first, second, and third plates 122, 124, and 126 stacked on each other, the respective operating fluids that flow in the first, second, and third connection channels 116a, 116b, and 116c formed therein are prevented from being mixed by the respective connection holes 123, 125, and 127 that protrude upward or the bottom on the first, second, and the third plates 122, 124, and 126.

Herein, the respective operating fluids may include medium-temperature and high-pressure liquid refrigerant supplied from the condenser 20 of the air-conditioning system, low-temperature and low-pressure gas refrigerant supplied from the evaporator 40, and LPG fuel returned from the engine 2.

First, the medium-temperature and the high-temperature liquid refrigerant is supplied from the condenser 20 and is introduced into the heat exchanging unit 110 through the first inlet 134.

The medium-temperature and high-temperature liquid refrigerant passes through the first connection channel 116a through the first connection holes 123a, 125a, and 127a of the respective plates 122, 124, and 126 and thereafter, is discharged through the first outlet 144 to be supplied to the expansion valve 30.

Low-temperature and low-pressure gas refrigerant is supplied from the evaporator 40 and is introduced into the heat exchanging unit 110 through the second inlet 136.

The low-temperature and low-pressure gas refrigerant passes through the second connection channel 116b through the second connection holes 123b, 125b, and 127b of the respective plates 122, 124, and 126 and thereafter, is discharged through the second outlet 146 to be supplied to the compressor 10.

The LPG fuel is returned from the engine 2 to be introduced into the heat exchanging unit 110 through the third inlet 138.

The LPG fuel passes through the third connection channel 116c through the third connection holes 123c, 125c, and 127c of the respective plates 122, 124, and 126 and thereafter, is discharged through the third outlet 148 to be returned to the bombe 4.

Herein, the medium-temperature and high-pressure liquid refrigerant and the LPG fuel may flow in the same direction on the first connection channel 116a and the third connection channel 116c formed with the second connection channel 116b interposed therebetween.

The low-temperature and low-pressure gas refrigerant may flow in an opposite direction to the medium-temperature and high-pressure liquid refrigerant and the LPG fuel passing through the first and second connection channels 116a and 116c on the connection channel 116b.

That is, in the heat exchanging unit 110, the first connection channel 116a and the third connection channel 116c are disposed on the top and the bottom of the connection channel 116b, respectively, as illustrated in FIG. 6.

As a result, when the medium-temperature and high-pressure liquid refrigerant and the LPG fuel pass through the first connection channel 116a and the third connection channel 116c, respectively, the medium-temperature and high-pressure liquid refrigerant and the LPG fuel more efficiently exchange heat with the low-temperature and low-pressure gas refrigerant that flows in opposite directions through the second connection channel 116b while the medium-temperature and high-pressure liquid refrigerant and the LPG fuel flow in the same direction.

In the exemplary embodiment, the first inlet 134 is connected with the condenser 20, the second inlet 136 is connected with the evaporator 40, and the third inlet 138 is connected with the engine 2 to circulate the respective operating fluids to the first, second, and third connection channels 116a, 116b, and 116c of the heat exchanging unit 110.

The first outlet 144 is interconnected with the expansion valve 30, the second outlet 146 is interconnected with the compressor 10, and the third outlet 148 is interconnected with the bombe 4 in which the LPG fuel is returned to be stored to supply the respective operating fluids passing through the first, second, and third connection channels 116a, 116b, and 116e to the expansion valve 30, the compressor 10, and the bombe 4, respectively.

Connection ports may be mounted on the respective inlets 134, 136, and 138 and the respective outlets 144, 146, and 148 which are configured above, respectively, and connection hoses or connection pipes are connected to the connection ports to be connected to the air conditioning system, the engine 2, and the bombe 4, respectively.

Herein, medium-temperature and high-pressure liquid refrigerant is condensed while non-condensed gas refrigerant included therein exchanges heat with the low-temperature and low-pressure gas refrigerant passing through the second connection channel 116b.

As a result, the heat exchanging unit 110 minimizes the non-condensed gas refrigerant that exists in the medium-temperature and high-pressure liquid refrigerant and thus supplies the minimized non-condensed gas refrigerant to the expansion valve 30 to increase expansion efficiency and prevent efficiency of the air conditioning system from deteriorating.

The LPG fuel is returned to the bombe 4 while the LPG fuel is cooled through exchanging heat with the low-temperature and low-pressure gas refrigerant to prevent internal pressure of the bombe 4 from being increased.

Hereinafter, an operation and an action of the heat exchange 100 for a vehicle according to the exemplary embodiment of the present invention configured as above will be described in detail.

Figure 7:
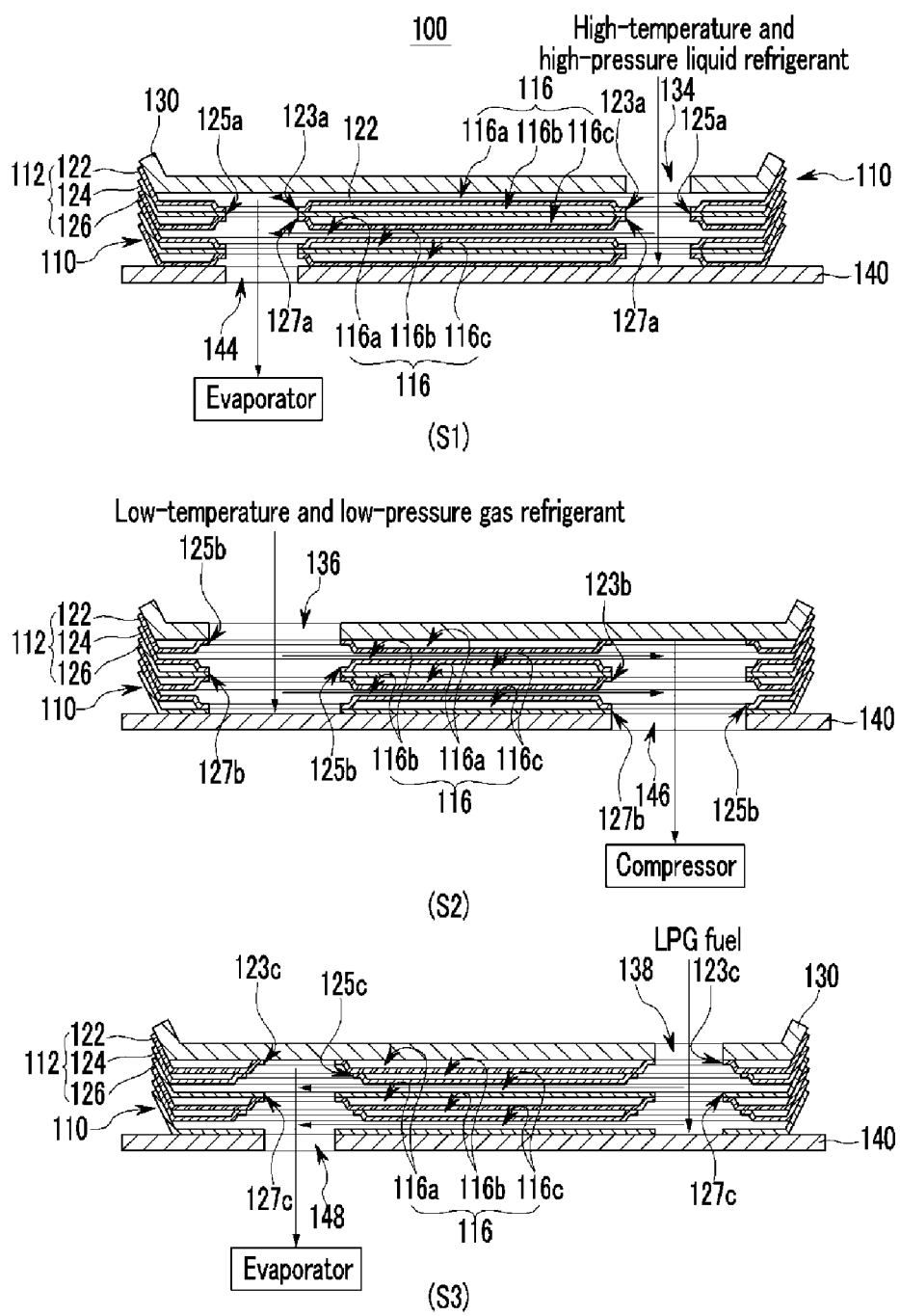
FIG. 7 is an operational state diagram of the heat exchanger for a vehicle according to the exemplary embodiment of the present invention.

FIG. 7 is an operational state diagram of the heat exchanger for a vehicle according to the exemplary embodiment of the present invention.

First, the medium-temperature and high-pressure liquid refrigerant supplied from the condenser 20 is introduced through the first inlet 134 to pass through the first connection channel 116a through the first connection holes 123a, 125a, and 127a of the first, second, and third plates 122, 124, and 126 and thereafter, is discharged to the expansion valve 30 through the first outlet 144, as described in S1 of FIG. 7.

Low-temperature and low-pressure gas refrigerant supplied from the evaporator 40 is introduced through the second inlet 136 to pass through the second connection channel 116b through the second connection holes 123b, 125b, and 127b of the first, second, and third plates 122, 124, and 126 and thereafter, is discharged to the compressor 10 through the second outlet 146, as described in S2 of FIG. 7.

Herein, medium-temperature and high-pressure liquid refrigerant is cooled to exchange heat with the low-temperature and low-pressure gas refrigerant passing through the second connection channel 116b at the time of passing through the first connection channel 116a disposed on the top of the second connection channel 116b in the heat exchanging unit 110.

In this case, the medium-temperature and high-pressure liquid refrigerant flows in an opposite direction to the low-temperature and low-pressure gas refrigerant on each connection channel 116, and as a result, the medium-temperature and high-pressure liquid refrigerant may be more efficiently cooled.

Herein, as the medium-temperature and high-pressure liquid refrigerant is disposed to be close to the upper cover 130 and passes through the first connection channel 116a positioned on the top of the second connection channel 116b, the temperature of the gas refrigerant may be prevented from being increased to a predetermined level by preventing heat in an engine room from directly exchanging heat with the low-temperature and low-pressure gas refrigerant.

As a result, cooling performance of the air-conditioning system may be prevented from deteriorating due to the increase in temperature of the gas refrigerant.

The high-temperature LPG fuel returned from the engine 2 is introduced through the third inlet 138 to pass through the third connection channel 116c through the third connection holes 123c, 125c, and 127c of the first, second, and third plates 122, 124, and 126 and thereafter, is supplied to the bombe 4 through the third outlet 148, as described in S3 of FIG. 7.

Herein, as low-temperature and low-pressure gas refrigerant flows to the second connection channel 116b positioned on the top of the third connection channel 116c in the heat exchanging unit 110, LNG fuel is cooled while exchanging heat with each other.

As such, cooled LPG fuel is discharged through the first outlet 148 to be supplied to the bombe 4.

Accordingly, in the heat exchanging unit 100, the high-temperature LPG fuel returned from the engine 2 is cooled to a temperature at an appropriate level through exchanging heat with the low-temperature and low pressure gas refrigerant to be discharged to the bombe 4, and as a result, the internal pressure of the bombe 4 is prevented from being increased due to the introduction of the high-temperature LPG fuel.

Meanwhile, as non-condensed gas refrigerant included in the medium-temperature and high-pressure liquid refrigerant is condensed through exchanging heat with the low-temperature and low-pressure gas refrigerant passing through the second connection channel 116b, efficiency of the air-conditioning system may be prevented from deteriorating due to the non-condensed gas refrigerant and expansion efficiency in the expansion valve 30 may be increased.

Accordingly, when the heat exchanger 100 for a vehicle according to the exemplary embodiment of the present invention configured as above is applied, the refrigerant circulated in the air-conditioning system and the LPG fuel returned to the bombe 4 exchange heat with each other, and as a result, the LPG fuel is introduced into the bombe 4 while the temperature of the LPG fuel is decreased to thereby prevent the internal pressure of the bombe 4 from being increased.

By preventing the internal pressure of the bombe 4 from being increased, fuel is smoothly injected to the bombe 4 and merchantability may be improved at the time of charging fuel.

The heat exchanger 100 for a vehicle according to the exemplary embodiment of the present invention is configured by at least one plate type heat exchanger including the plate unit 112 in which two or more plates are stacked, makes the medium-temperature and high-pressure liquid refrigerant supplied from the condenser 20 and the low-temperature and low-pressure gas refrigerant supplied from the evaporator 40 exchange heat with each other therein to prevent performance of the air-conditioning system from deteriorating by improving cooling efficiency of refrigerant by using an overcooling effect and improve cooling performance.

By performing overcooling of refrigerant and cooling LPG fuel in a narrow engine room at the same time, spatial utilization may be improved and a layout may be simplified.

Meanwhile, a heat exchanger for a vehicle according to another exemplary embodiment of the present invention will be described below with reference to FIGS. 8 to 1.

Figure 8:
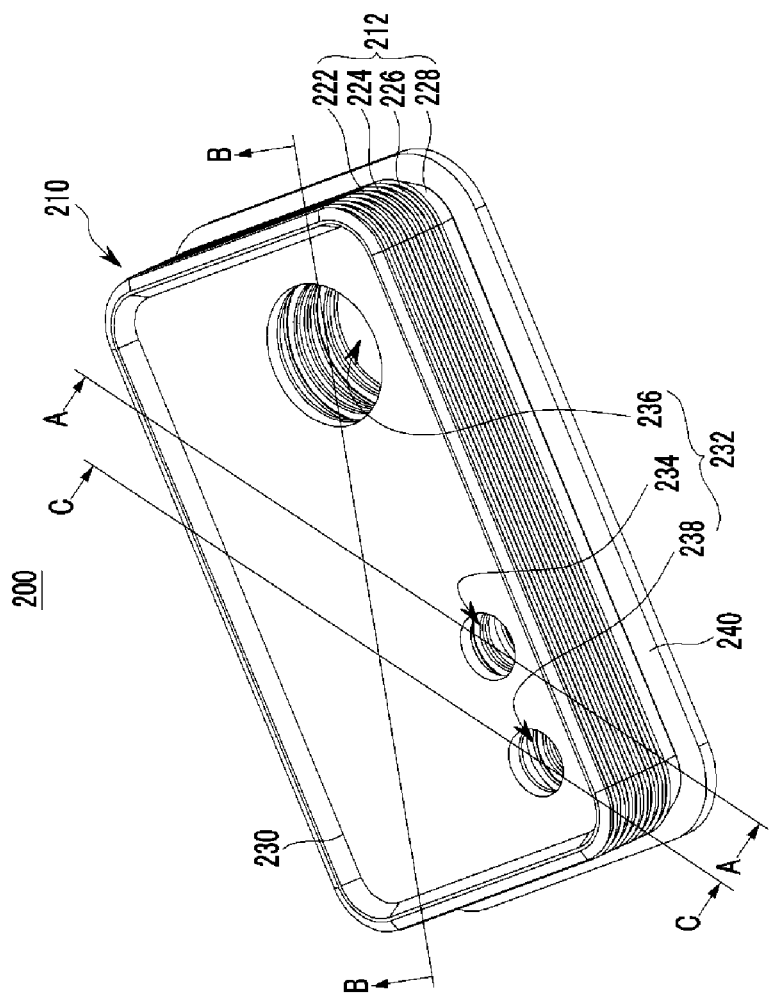
FIG. 8 is a perspective view of a heat exchanger for a vehicle according to another exemplary embodiment of the present invention.
Figure 9:
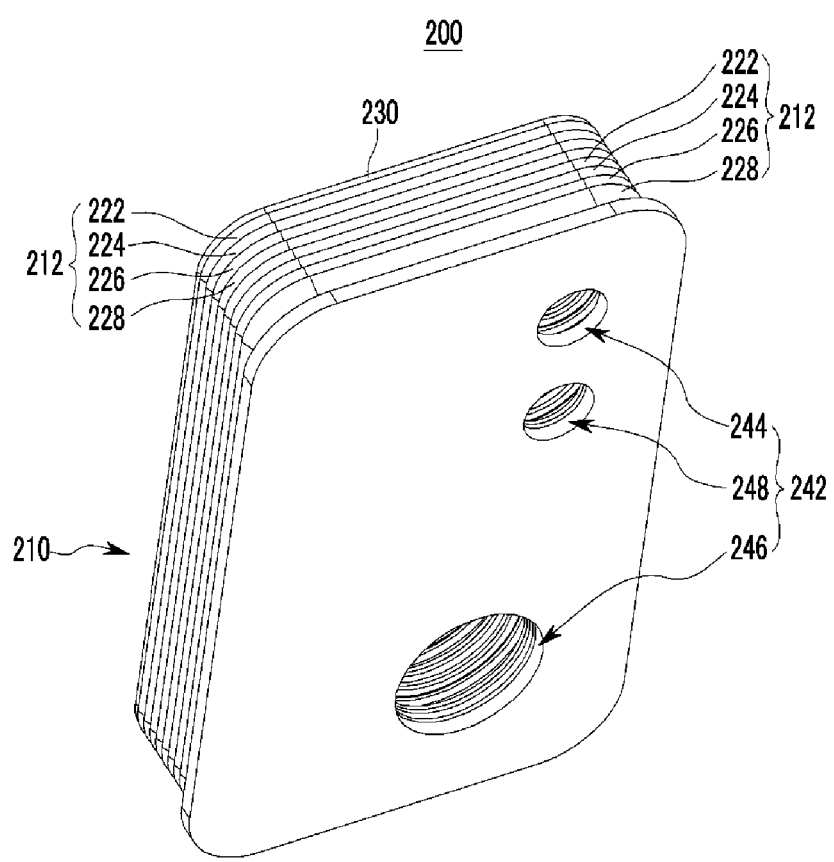
FIG. 9 is a back perspective view of the heat exchanger for a vehicle according to another exemplary embodiment of the present invention.
Figure 10:
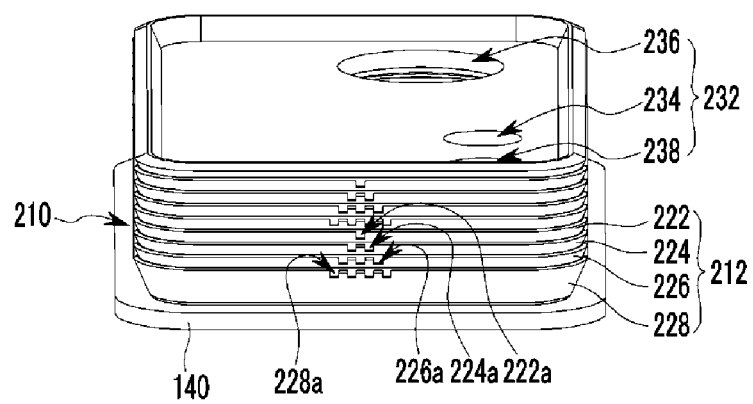
FIG. 10 is an exploded perspective view of a plate unit applied to the heat exchanger for a vehicle according to another exemplary embodiment of the present invention.
Figure 11:
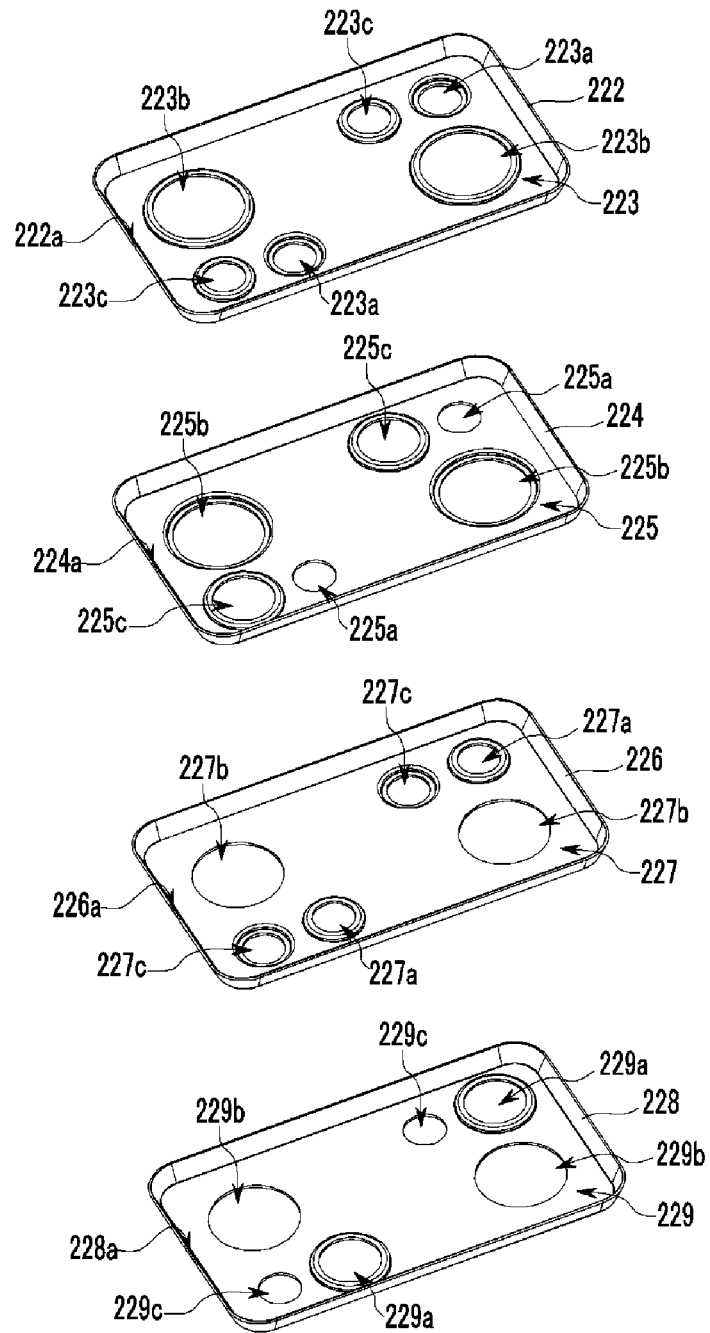
FIG. 11 is a side view of the heat exchanger for a vehicle according to another exemplary embodiment of the present invention.
Figure 12:
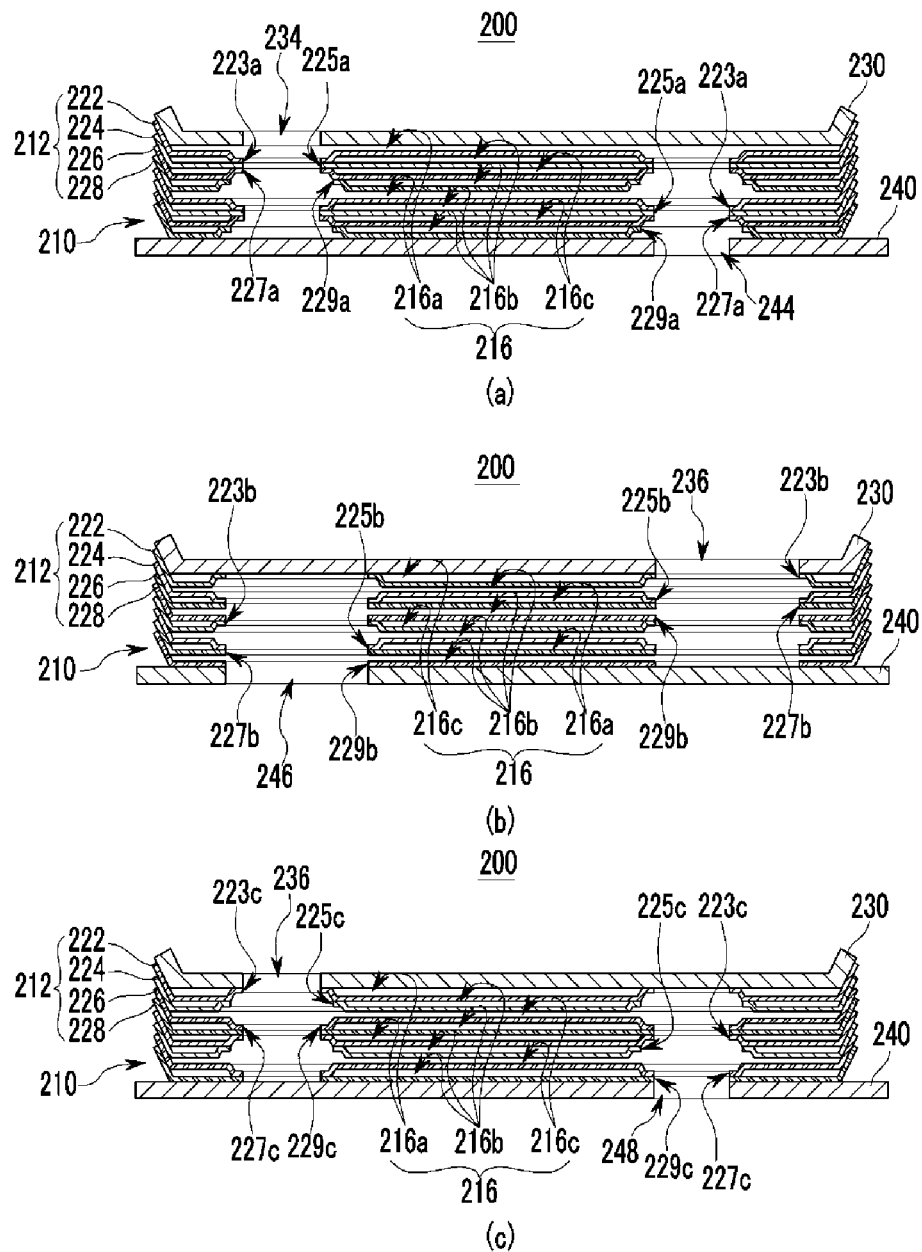
FIG. 12 is a cross-sectional view taken along lines A-A, B-B, and C-C of FIG. 8.

FIGS. 8 and 9 are a perspective view and a back perspective view of a heat exchanger for a vehicle according to another exemplary embodiment of the present invention, according to another exemplary embodiment of the present invention, FIG. 10 is an exploded perspective view of a plate unit applied to the heat exchanger for a vehicle according to another exemplary embodiment of the present invention, FIG. 11 is a side view of the heat exchanger for a vehicle according to another exemplary embodiment of the present invention, and FIG. 12 is a cross-sectional view taken along lines A-A, B-B, and C-C of FIG. 8.

Referring to the drawings, a heat exchanger 200 for a vehicle according to another exemplary embodiment of the present invention is applied to an air-conditioning system including a compressor 10 compressing refrigerant, a condenser 20 condensing the compressed refrigerant by receiving the compressed refrigerant from the compressor 10, an expansion valve 30 expanding liquefied refrigerant condensed through the condenser 20, and an evaporator 40 evaporating the refrigerant expanded through the expansion valve 30 through heat-exchange with air.

The heat exchanger 200 for a vehicle according to another exemplary embodiment of the present invention includes a heat exchanging unit 210, an upper cover 230, and a lower cover 240, as illustrated in FIGS. 8 and 9.

In the heat exchanging unit 210, one or more plate units 212 in which two or more plates are stacked to form different connection channels 216 (see FIG. 12) are provided to be coupled to each other, and different operating fluids exchange heat with each other while passing through the respective connection channels 216 (see FIG. 12).

The heat exchanging unit 210 configured as above may be formed by a plate type (alternatively, also referred to as a 'plate type') in which a pair of plate units 212 are stacked and coupled with each other or formed by coupling a plurality of plate units.

In another exemplary embodiment of the present invention, the upper cover 230 and the lower cover 240 are mounted on the top and the bottom of the heat exchanging unit 210, respectively.

First, second, and third inlets 234, 236, and 238 respectively further from each other are formed in the upper cover 230, and first, second, and third outlets 244, 246, and 248 respectively further from each other are formed in the lower cover 240. Since this is the same as the exemplary embodiment, a detailed description of the configuration and the function will be omitted.

Herein, the plate unit 212 according to another exemplary embodiment of the present invention includes a first plate 222, a second plate 224, a third plate 226, and a fourth plate 228, as illustrated in FIGS. 10 and 11, and (a), (b) and (c) of FIG. 12.

The first plate 222 is coupled with being stacked on the upper cover 230 below the upper cover 230.

A first connection channel 216a is formed between the first plate 222 and the upper cover 230, and first, second, and third connection holes 223a, 223b, and 223c are formed on the first plate 222 to correspond to the respective inlets 234, 236, and 238 and the respective outlets 244, 246, and 248, respectively.

Herein, the first, second, and third connection holes 223a, 223b, and 223c of the first plate 222 may be each formed in two to correspond to the respective inlets 234, 236, and 238 and the respective outlets 244, 246, and 248.

An inner periphery of the first connection hole 223a of the first plate 222 protrudes downward of the first plate 222.

Inner peripheries of the second connection hole 223b and the third connection 223c of the first plate 222 may protrude upward of the first plate 222.

In another exemplary embodiment, the second plate 224 is coupled with being stacked on the first plate 222 below the first plate 222.

A second connection channel 216b is formed between the second plate 224 and the first plate 222, and first, second, and third connection holes 225a, 225b, and 225c are formed on the second plate 224 to correspond to the respective inlets 234, 236, and 238 and the respective outlets 244, 246, and 248, respectively.

Herein, the first, second, and third connection holes 225a, 225b, and 225c of the second plate 225 may be each formed in two to correspond to the respective inlets 234, 236, and 238 and the respective outlets 244, 246, and 248.

An inner periphery of the second connection hole 225b of the second plate 224 protrudes upward of the second plate 224.

An inner periphery of the third connection hole 225c of the second plate 224 may protrude downward of the second plate 224.

In another exemplary embodiment, the third plate 226 is coupled with being stacked on the second plate 224 below the second plate 224.

A third connection channel 216c is formed between the third plate 226 and the second plate 224, and first, second, and third connection holes 227a, 227b, and 227c are formed on the third plate 226 to correspond to the respective inlets 234, 236, and 238 and the respective outlets 244, 246, and 248, respectively.

Herein, the first, second, and third connection holes 227a, 227b, and 227c of the third plate 226 may be each formed in two to correspond to the respective inlets 234, 236, and 238 and the respective outlets 244, 246, and 248.

An inner periphery of the first connection hole 227a of the third plate 226 protrudes upward of the third plate 226.

An inner periphery of the second connection hole 227b of the third plate 226 may protrude downward of the third plate 226.

In another exemplary embodiment, a fourth plate 228 is coupled with being stacked on the third plate 226 below the third plate 226.

The second connection channel 216b is formed between the fourth plate 228 and the third plate 226, and first, second, and third connection holes 229a, 229b, and 229c are formed on the fourth plate 228 to correspond to the respective inlets 234, 236, and 238 and the respective outlets 244, 246, and 248, respectively.

Herein, the first, second, and third connection holes 229a, 229b, and 229c of the fourth plate 228 may be each formed in two to correspond to the respective inlets 234, 236, and 238 and the respective outlets 244, 246, and 248.

An inner periphery of the first connection hole 229a of the fourth plate 228 may protrude upward of the fourth plate 228.

As a result, when the assembly of the plate unit 212 is completed with the first, second, third, and fourth plates 222, 224, 226, and 228 stacked on each other, the respective operating fluids that flow in the first, second, and third connection channels 216a, 216b, and 216c formed therein are prevented from being mixed by the respective connection holes 223, 225, 227, and 229 that protrude upward or the bottom on the first, second, third, and fourth plates 222, 224, 226, and 228.

That is, the heat exchanging unit 210 according to another exemplary embodiment of the present invention configured as above makes the respective operating fluids to the first, second, and third connection channels 216a, 216b, and 216c formed in each plate unit 212 flow to exchange heat with each other.

Herein, the second connection channel 216b is formed between the first plate 222 and the second plate 224 and between the third plate 226 and the fourth plate 228.

In the plate unit 212 configured as above, first, second, third, and fourth verification grooves 222a, 224a, 226a, and 228a are formed at sides of the first, second, third, and fourth plates 222, 224, 226, and 228 so as to be sequentially assembled when the first, second, third, and fourth plates 222, 224, 226, and 228 are stacked and coupled with each other.

The respective verification grooves 222a, 224a, 226a, and 228a may be formed in order to verify whether the respective plates 222, 224, 226, and 228 are misassembled when the respective plates 222, 224, 226, and 228 are assembled. For example, in another exemplary embodiment of the present invention, the first verification groove 222a may be formed in one, the second verification groove 224b may be formed in two, the third verification groove 226a may be formed in three, and the fourth verification groove 228a may be formed in four.

As a result, the worker may assemble the plate unit 212 by sequentially stacking the respective plates 222, 224, 226, and 228 through the respective verification grooves 222a, 224a, 226a, and 228a at the time of assembling the first, second, third, and fourth plates 222, 224, 226, and 228.

Since the worker may easily determine whether the plate unit 212 is misassembled by verifying arrangement of the respective verification grooves 222a, 224a, 226a, and 228a at the time of inspection for the misassembly verification of the assembled plate unit 212, the misassembly of the plate unit 212 may be easily verified and a time required for inspection may be shortened.

Meanwhile, in another exemplary embodiment of the present invention, the respective operating fluids may include medium-temperature and high-pressure liquid refrigerant supplied from the condenser 20 of the air-conditioning system, low-temperature and high-pressure gas refrigerant supplied from the evaporator 40, and LPG fuel returned from the engine 2, similarly as the exemplary embodiment.

That is, the heat exchanging unit 210 configured as above makes the respective operating fluids to the first, second, and third connection channels 216a, 216b, and 216c formed in each plate unit 212 flow to exchange heat with each other.

Herein, low-temperature and low-pressure gas refrigerant passes through the second connection channel 216b formed between the first plate 222 and the second plate 224 and between the third plate 226 and the fourth plate 228.

Herein, gas refrigerant exchanges heat with medium-temperature and high-pressure liquid refrigerant and the LPG fuel that pass through the first connection channel 216a and the third connection channel 216b disposed on the top and the bottom of the second connection channel 216b in opposite directions, respectively.

Accordingly, the medium-temperature and high-pressure liquid refrigerant and the LPG fuel are cooled through exchanging heat with the low-temperature and low-pressure gas refrigerant and flow in opposite directions to the gas refrigerant to improve heat exchange efficiency.

Herein, the non-condensed gas refrigerant included in the medium-temperature and high-pressure liquid refrigerant is condensed while exchanging heat with the low-temperature and low-pressure gas refrigerant passing through the second connection channel 216b.

As a result, the heat exchanging unit 210 minimizes the non-condensed gas refrigerant that exists in the medium-temperature and high-pressure liquid refrigerant and thus supplies the minimized non-condensed gas refrigerant to the expansion valve 30 to increase expansion efficiency and prevent efficiency of the air conditioning system from deteriorating at the same time.

The LPG fuel is returned to the bombe 4 while the LPG fuel is cooled through exchanging heat with the low-temperature and low-pressure gas refrigerant to prevent internal pressure of the bombe 4 from being increased.

Hereinafter, an operation and an action of the heat exchange 200 for a vehicle according to another exemplary embodiment of the present invention configured as above will be described in detail.

FIG. 13 is an operational state diagram of the heat exchanger for a vehicle according to another exemplary embodiment of the present invention.

First, the medium-temperature and high-pressure liquid refrigerant supplied from the condenser 20 is introduced through the first inlet 234 to pass through the first connection channel 216a through the first connection holes 223a, 225a, 227a, and 229a of the first, second, third, and fourth plates 222, 224, 226, and 228 and thereafter, is discharged to the expansion valve 30 through the first outlet 244, as described in S1 of FIG. 13.

Low-temperature and low-pressure gas refrigerant supplied from the evaporator 40 is introduced through the second inlet 236 to pass through the second connection channel 216b formed between the first and second plates 222 and 224 and between the third and fourth plates 226 and 228 through the second connection holes 223b, 225b, 227b, and 229b of the first, second, third, and fourth plates 222, 224, 226, and 228 and thereafter, is discharged to the compressor 10 through the second outlet 246, as described in S2 of FIG. 13.

Herein, medium-temperature and high-pressure liquid refrigerant is cooled to exchange heat with the low-temperature and low-pressure gas refrigerant passing through the second connection channel 216b at the time of passing through the first connection channel 216a disposed between the respective second connection channels 216b in the heat exchanging unit 210.

In this case, medium-temperature and high-pressure liquid refrigerant flows in an opposite direction to low-temperature and low-pressure gas refrigerant on the respective connection channels 216a and 216b, and as a result, the medium-temperature and high-pressure liquid refrigerant may be more efficiently cooled.

Herein, as the medium-temperature and high-pressure liquid refrigerant is disposed to be close to the upper cover 230 and passes through the first connection channel 216a positioned on the top of the second connection channel 216b, the temperature of the gas refrigerant may be prevented from being increased to a predetermined level by preventing heat in an engine room from directly exchanging heat with the low-temperature and low-pressure gas refrigerant.

As a result, cooling performance of the air-conditioning system may be prevented from deteriorating due to the increase in temperature of the gas refrigerant.

The high-temperature LPG fuel returned from the engine 2 is introduced through the third inlet 238 to pass through the third connection channel 216c through the third connection holes 223c, 225c, 227c, and 229c of the first, second, third, and fourth plates 222, 224, 226, and 228 and thereafter, is discharged to the bombe 4 through the third outlet 248, as described in S3 of FIG. 13.

Herein, as low-temperature and low-pressure gas refrigerant flows to the second connection channel 216b positioned on each of the top and the bottom of the third connection channel 216c in the heat exchanging unit 210, LNG fuel is cooled while exchanging heat with the low-temperature and low-pressure gas refrigerant.

In the heat exchanging unit 210, the respective plate units 212 that form a pair are stacked, and as a result, the first connection channels 216a and the third connection channels 216c are alternately repetitively formed between the second connection channels 216b. The low-temperature and low-pressure gas refrigerant exchanges heat with each of the liquid refrigerant and the LPG fuel.

Accordingly, loss of heat transfer is prevented by preventing the medium-temperature and high-pressure liquid refrigerant and the LPG fuel from directly exchanging heat with each other. As a result, the liquid refrigerant and the LPG fuel may be cooled to a temperature at an appropriate level.

As such, the LPG fuel cooled to the appropriate level is discharged through the third outlet 248 to be supplied to the bombe 4.

Accordingly, in the heat exchanging unit 200, the high-temperature LPG fuel returned from the engine 2 is cooled to a temperature at an appropriate level through exchanging heat between the low-temperature and low-pressure gas refrigerant the medium-temperature and high-pressure liquid refrigerant to be discharged to the bombe 4, and as a result, the internal pressure of the bombe 4 is prevented from being increased due to the introduction of the high-temperature LPG fuel.

Meanwhile, as non-condensed gas refrigerant included in the medium-temperature and high-pressure liquid refrigerant is condensed through exchanging heat with the low-temperature and low-pressure gas refrigerant passing through the second connection channel 216b, efficiency of the air-conditioning system may be prevented from deteriorating due to the non-condensed gas refrigerant and.

Accordingly, when the heat exchanger 200 for a vehicle according to another exemplary embodiment of the present invention configured as above is applied, refrigerant circulated in the air-conditioning system and the LPG fuel returned to the bombe 4 exchange heat with each other, and as a result, the LPG fuel is introduced into the bombe 4 while the temperature of the LPG fuel is decreased to thereby prevent the internal pressure of the bombe 4 from being increased.

By preventing the internal pressure of the bombe 4 from being increased, fuel is smoothly injected to the bombe 4 and merchantability may be improved at the time of charging fuel.

The heat exchanger 200 for a vehicle according to the exemplary embodiment of the present invention is configured by at least one plate type heat exchanger including the plate unit 212 in which two or more plates are stacked, makes the medium-temperature and high-pressure liquid refrigerant supplied from the condenser 20 and the low-temperature and low-pressure gas refrigerant supplied from the evaporator 40 exchange heat with each other therein to prevent performance of the air-conditioning system from deteriorating by improving cooling efficiency of refrigerant using an overcooling effect, and improve cooling performance.

By performing overcooling of refrigerant and cooling LPG fuel in a narrow engine room at the same time, spatial utilization may be improved and a layout may be simplified.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings. as well as various alternatives and modifications thereof. It is intended that the scope of the invention be defined by the Claims appended hereto and their equivalents.

What is claimed is:

1. A heat exchanger apparatus for a vehicle, comprising:
a heat exchanging unit including three or more plate units,
an upper cover mounted on a first side of the heat exchanging unit; and
a lower cover mounted on a second side of the heat exchanging unit,
wherein each plate unit of the heat exchanger unit includes three or more plates stacked to form different connection channels, the three or more plates exchanging heat with each other while each one of different operating fluids passes through corresponding connection channels in the heat exchanging unit,
wherein each plate includes a connection hole and at least two of any three adjacent plates in each plate unit have a depression immediately adjacent to the connection hole to form an inner periphery of the connection hole,
wherein the upper cover includes a plurality of inlets, each of the plurality of inlets introducing a different one of the different operating fluids into the heat exchanging unit respectively, and being interconnected with the corresponding connection channels,
wherein the lower cover includes a plurality of outlets that are interconnected with the corresponding connection channels so as to discharge the different operating fluids passing through the heat exchanging unit,
wherein the three or more plate units include:
a first plate stacked on and coupled to the upper cover below the upper cover, and including a first connection channel formed between the first plate and the upper cover and a plurality of connection holes formed to correspond to the respective inlets and the respective outlets;
a second plate stacked on and coupled to the first plate below the first plate, and including a second connection channel formed between the second plate and the first plate and a plurality of connection holes formed to correspond to the respective inlets and the respective outlets; and
a third plate stacked on and coupled to the second plate below the second plate, and including a third connection channel formed between the third plate and the second plate and a plurality of connection holes formed to correspond to the respective inlets and the respective outlets,
wherein the plurality of inlets includes first, second, and third inlets respectively spaced from each other in a length direction of the upper cover and connected with the first, second, and third connection channels through the corresponding connection holes, and
wherein the plurality of outlets includes first, second, and third outlets respectively spaced from each other on the lower cover to correspond to the first, second, and third inlets, and connected with the first, second, and third inlets through the first, second, and third connection channels and the corresponding connection holes.

2. The heat exchanger apparatus for a vehicle of claim 1,
wherein in the first plate, first, second, and third connection holes are formed to correspond to the first, second, and third inlets, and the first, second, and third outlets, respectively,
wherein in the second plate, first, second, and third connection holes are formed to correspond to the first, second, and third inlets, and the first, second, and third outlets, respectively, and
wherein in the third plate, first, second, and third connection holes are formed to correspond to the first, second, and third inlets, and the first, second, and third outlets, respectively,
wherein inner peripheries of the second and third connection holes of the first plate protrude upward and an inner periphery of the first connection hole of the first plate protrudes downward, wherein an inner periphery of the third connection hole of the second plate protrudes upward and an inner periphery of the second connection hole of the second plate protrudes downward, wherein an inner periphery of the first connection hole of the third plate protrudes upward, and wherein airtightness of inner peripheries of the corresponding connection holes is maintained so as to prevent the each operating fluid that flows in the corresponding connection channels from being mixed.

3. The heat exchanger apparatus for a vehicle of claim 1, wherein the first inlet is formed at one side in a width direction of and at the center of the upper cover, and the first outlet is formed at a diagonal corresponding position from the first inlet of the lower cover.

4. The heat exchanger apparatus for a vehicle of claim 1, wherein the second inlet is formed at a side of the upper cover, and the second outlet is formed at a diagonal corresponding position of the lower cover.

5. The heat exchanger apparatus for a vehicle of claim 1, wherein the third inlet is formed at a side of the upper cover, and the third outlet is formed at a diagonal corresponding position from the third inlet of the lower cover.

6. The heat exchanger apparatus for a vehicle of claim 1, wherein in the first, second, and third plates, first, second, and third verification grooves are formed at sides of corresponding plates of the first, second, and third plates to ensure that the corresponding plates are sequentially assembled when the corresponding plates are stacked and coupled with each other.

7. The heat exchanger apparatus for a vehicle of claim 1, wherein the heat exchanging unit is formed by stacking a plurality of three or more plate units.

8. The heat exchanger apparatus for the vehicle of claim 1, wherein the plate unit includes
a fourth plate coupled with being stacked on the third plate below the third plate, and including the second connection channel between the fourth plate and the third plate and a plurality of connection holes formed on the fourth plate to correspond to the respective inlets and the respective outlets, respectively.

9. The heat exchanger apparatus for the vehicle of claim 8,
wherein in the first plate, first, second, and third connection holes are formed to correspond to the first, second, and third inlets and the first, second, and third outlets, respectively, wherein in the second plate, first, second, and third connection holes are formed to correspond to the first, second, and third inlets and the first, second, and third outlets, respectively, wherein in the third plate, first, second, and third connection holes are formed to correspond to the first, second, and third inlets and the first, second, and third outlets, respectively, wherein in the fourth plate, first, second, and third connection holes are formed to correspond to the first, second, and third inlets and the first, second, and third outlets, respectively, wherein inner peripheries of the second and third connection holes of the first plate protrude upward and an inner periphery of the first connection hole thereof protrudes downward, wherein an inner periphery of the third connection hole of the second plate protrudes upward and an inner periphery of the second connection hole thereof protrudes downward, wherein an inner periphery of the first connection hole of the third plate protrudes upward and an inner periphery of the third connection hole thereof protrudes downward, wherein an inner periphery of the first connection hole of the fourth plate protrudes upward, and wherein airtightness of inner peripheries of the respective connection holes is maintained so as to prevent each operating fluid that flows in the respective connection channels from being mixed.

10. The heat exchanger apparatus for the vehicle of claim 8, wherein in the first, second, third, and fourth plates, first, second, third, and fourth verification grooves are formed at sides of the respective plates to verify that the respective plates are sequentially assembled when the respective plates are stacked and coupled with each other.

11. The heat exchanger apparatus for the vehicle of claim 10, wherein the respective verification grooves are different in number.

* * * * *